O. S. JARVIS.
Improvement in Horse Hay-Rakes.
No. 114,150.
Patented April 25, 1871.
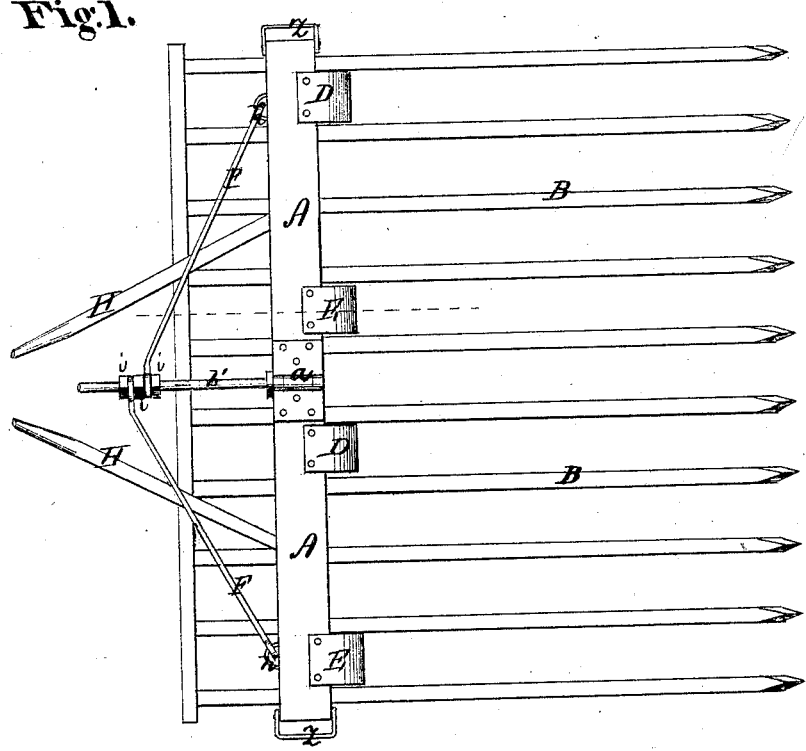
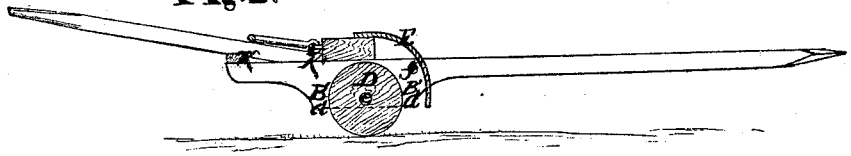

UNITED STATES PATENT OFFICE.

OLIVER SMITH JARVIS, OF XENIA, ILLINOIS.

IMPROVEMENT IN HORSE HAY-RAKES.

Specification forming part of Letters Patent No. 114,150, dated April 25, 1871.

*To all whom it may concern:*

Be it known that I, OLIVER SMITH JARVIS, of Xenia, in the county of Clay and State of Illinois, have invented a new and valuable Improvement in Hay-Rakes; and I do hereby declare that the following is a full, clear, and exact description of the construction and operation of the same, reference being had to the annexed drawing, making a part of this specification, and to the letters and figures of reference marked thereon.

Figure 1 of the drawing is a top view of my invention. Fig. 2 is a central vertical longitudinal section.

The nature of my invention consists in the construction and novel arrangement of hay-rakes, as will be hereinafter fully set forth.

In order to enable others skilled in the art to which my invention appertains to make and use the same, I will now proceed to describe its construction and operation, referring to the annexed drawing.

A A represent the rake-head, made in two sections, with the teeth B attached. These teeth are such as are ordinarily used in wooden rakes. The rake-heads A A are connected together by means of a hinge, $a$, and rod $b'$, as shown on the drawing, which permit the sections of the rake to bend up or down laterally, so as to conform to the unevenness of the ground. On the teeth (marked B') are formed enlargements $d$ on the under side, which may be made in any suitable shape, or as shown on the drawing in Fig. 2; or they may be metal bearings, attached by means of bolts or otherwise. Between these enlargements are revolving rollers D. These rollers are hung or pivoted to the enlargements $d$ by means of the journals $e$. These rollers are used on the inside of the draft-loops $z$ on account of the irregular side draft which very often obtains in the operation of these machines. The said rollers also assist in supporting the rake, and prevent friction and wear occasioned by the rake sliding on the ground, and at the same time tend to give the teeth a suitable inclination for raking.

E represents metal shields secured to the top of the rake-heads by means of screws or bolts, as shown on the drawing. The office of these shields is to protect the rollers and to prevent them from clogging up with the hay, &c. The shields are kept in a perpendicular position by the rods $f$ passing through the enlargements $d$, and thus held securely in rear of the shield, as shown in Fig. 2.

F F represent braces, connected to the rake-heads by the staples $h''$, and fastened to the rod $b'$ by nuts $i$. H represents the handles, securely fastened to the rakes at K K'.

What I claim as my invention, and desire to secure by Letters Patent, is—

The hay-rake herein described, provided with rollers D, shields E, sectional rake-heads A, hinge $a$, rod $b'$, and braces F F, all substantially as and for the purpose specified.

In testimony that I claim the above I have hereunto subscribed my name in the presence of two witnesses.

OLIVER SMITH JARVIS.

Witnesses:
I. L. WAMACK,
S. R. PAINTER.